United States Patent
Peng et al.

(10) Patent No.: US 9,399,288 B2
(45) Date of Patent: Jul. 26, 2016

(54) APPARATUS FOR DRIVING SCARA ROBOT

(71) Applicant: DELTA ELECTRONICS, INC., Kuei San (TW)

(72) Inventors: Chih-Cheng Peng, Hsinchu (TW); Tsao-Hsiang Wang, Taichung (TW); Hsin-Hsien Wu, Changhua County (TW)

(73) Assignee: DELTA ELECTRONICS, INC. (TW)

( * ) Notice: Subject to any disclaimer, the term of this patent is extended or adjusted under 35 U.S.C. 154(b) by 0 days.

(21) Appl. No.: 14/068,115

(22) Filed: Oct. 31, 2013

(65) Prior Publication Data

US 2014/0174240 A1 Jun. 26, 2014

(30) Foreign Application Priority Data

Dec. 24, 2012 (TW) .............................. 101149498 A (51) Int. Cl.
*B25J 9/04* (2006.01)
*B25J 9/12* (2006.01)
*B25J 19/02* (2006.01)
*H02K 7/102* (2006.01)
*H02K 41/02* (2006.01)
*B25J 19/00* (2006.01)
*B25J 13/08* (2006.01)
*H02K 41/035* (2006.01)

(52) U.S. Cl.
CPC *B25J 9/126* (2013.01); *B25J 9/042* (2013.01); *B25J 9/044* (2013.01); *B25J 9/123* (2013.01); *H02K 7/102* (2013.01); *H02K 41/02* (2013.01); *B25J 13/08* (2013.01); *B25J 19/0004* (2013.01); *B25J 19/021* (2013.01); *H02K 41/0354* (2013.01); *H02K 41/0356* (2013.01); *Y10T 74/20317* (2015.01)

(58) Field of Classification Search
CPC ............ B25J 9/042; B25J 9/123; B25J 13/08; B25J 19/0004; B25J 19/021; B25J 9/1694; B25J 13/088; H02K 7/102; H02K 41/02; H02K 41/0354; H02K 41/0356
USPC .......... 74/490.01–490.06; 901/15, 23, 40, 50, 901/47; 33/1 PT, 1 N; 188/75, 76, 78, 166, 188/167, 171, 343, 67, 74, 72.7, 177; 250/234–236
See application file for complete search history.

(56) References Cited

U.S. PATENT DOCUMENTS

| | | | | |
|---|---|---|---|---|
| 3,533,703 A | * | 10/1970 | Wingate | 356/396 |
| 3,643,765 A | * | 2/1972 | Hanchen | 188/170 |
| 4,566,847 A | | 1/1986 | Maeda et al. | |
| 4,796,746 A | * | 1/1989 | Bergstrom | B65G 47/8861 188/67 |
| 5,046,915 A | * | 9/1991 | Azuma et al. | 414/744.5 |
| 5,162,713 A | * | 11/1992 | Mohri et al. | 318/568.19 |

(Continued)

FOREIGN PATENT DOCUMENTS

| | | | | |
|---|---|---|---|---|
| GB | 1365593 A | * | 9/1974 | F16D 59/02 |
| JP | 2010076024 A | * | 4/2010 | |

*Primary Examiner* — William Kelleher
*Assistant Examiner* — Bobby Rushing, Jr.
(74) *Attorney, Agent, or Firm* — Hauptman Ham, LLP (57) ABSTRACT

An apparatus for driving a SCARA robot is provided. The apparatus includes a body, a horizontal rotating arm, a linear motor coil and a vertical magnetic axis. The linear motor coil is disposed on the horizontal rotating arm, and the vertical magnetic axis is passed through the linear motor coil. Wherein, the vertical magnetic axis can be driven by the linear motor coil of the horizontal rotating arm by a non-contact magnetic force.

5 Claims, 10 Drawing Sheets

(56) References Cited

U.S. PATENT DOCUMENTS

| | | | |
|---|---|---|---|
| 5,327,795 A * | 7/1994 | Katahira | 74/89.3 |
| 5,392,663 A * | 2/1995 | Charles | 74/490.03 |
| 5,912,458 A * | 6/1999 | Squires et al. | 250/234 |
| 5,988,342 A * | 11/1999 | Ito | B23Q 1/28 188/67 |
| 6,068,442 A * | 5/2000 | Flemmer et al. | 414/744.5 |
| 6,236,451 B1 * | 5/2001 | Wildenberg | 356/73 |
| 6,748,649 B2 * | 6/2004 | Okuda et al. | 29/740 |
| 6,802,402 B2 * | 10/2004 | Bausch et al. | 188/171 |
| 7,336,012 B2 | 2/2008 | Tanaka | |
| 7,622,079 B2 * | 11/2009 | Lehto | 422/65 |
| 7,649,290 B2 * | 1/2010 | Michioka et al. | 310/90 |
| 7,770,700 B2 * | 8/2010 | Yajima | H02K 7/1026 188/267 |
| 7,825,548 B2 * | 11/2010 | Maemura et al. | 310/12.02 |
| 8,602,177 B2 * | 12/2013 | Mead | 188/67 |
| 8,651,612 B2 * | 2/2014 | Lindenaar | 347/16 |
| 2004/0066335 A1 * | 4/2004 | Ashjaee | 343/700 MS |
| 2005/0052150 A1 | 3/2005 | Bender | |
| 2008/0282821 A1 * | 11/2008 | Tokumitsu | 74/29 |
| 2008/0309260 A1 * | 12/2008 | Kanai et al. | 318/38 |
| 2012/0249657 A1 | 10/2012 | Lindenaar | |

\* cited by examiner

APPARATUS FOR DRIVING SCARA ROBOT

RELATED APPLICATIONS

The application claims priority to Taiwan Application Serial Number 101149498, filed on Dec. 24, 2012, which is herein incorporated by reference.

BACKGROUND

1 Technical Field

The present disclosure relates to an apparatus for driving a robot and driving method thereof, more particularly, the present disclosure relates to an apparatus for driving a SCARA robot and driving method thereof.

2. Description of Related Art

Conventional SCARA (Selective Compliance Articulated Robot Arm) robot performs a rotational displacement on a horizontal plane by a horizontal rotating arm disposed on a base, or by multiple-linked horizontal rotating arms disposed on the base so as to perform more complicated actions. A vertical working axis is usually attached to an end of the horizontal rotating arm of the aforementioned SCARA robot, and the vertical working axis usually conducts a vertical raising/lowering action and a rotating action.

The working axis is complicated in design and structure. The most common working axis in the market includes two motors, a linear way, a ball screw and a ball spline, all of which are disposed on the end of the horizontal rotating arm. One of the motors is used for driving the ball screw for performing the raising/lowering action, and the other motor is used for rotating the ball spline. Therefore, the working axis is capable of performing the raising/lowering action and the rotating motion. However, there exist some problems in the design of the working axis:

a. High cost results from the complicated structures of the two motors and the linear way.

b. The heavy weight of the two motors and the linear way cause a larger loading of the horizontal rotating arm of the SCARA robot, and therefore the increased inertia reduces the stability of the horizontal rotating arm.

c. Conventionally one of the motors is used for driving the ball screw for the raising/lowering action, and the other motor is used for rotating the ball spline; the controllability of the hardware of the two motors cooperated with other equipment and the software used for driving the motors are very complicated, which lead to a high cost on the maintenance and repairing of the machine.

There is a second kind of working axis capable of performing the raising/lowering action as well as the rotating action. In the second design, a ball screw groove and a ball spline groove are formed on the working axis, and two motors are utilized for driving the ball screw nut and the ball spline nut on the working axis. Therefore, the raising/lowering action and the rotation action can be performed by the working axis. However, the second design still has some issues as follows:

a. It is complicated and difficult to form the ball screw groove and the ball spline groove on the working axis, such that the complicated manufacturing process increases the cost.

b. The heavy weight of the two motors still makes a large burden on the horizontal rotating arm of the SCARA robot, and thus the increased inertia reduces the stability of the horizontal rotating arm.

c. It is complicated for the assembly of the ball screw groove and the ball spline groove on the working axis cooperated with the motor-driven ball screw nut and the ball spline nut, so are the controllability of the hardware of the two motors cooperated with other equipment and the software used for driving the motors. Therefore, it is difficult to reduce the cost of the assembling, maintenance and repairing of the machine.

The conventional first working axis includes motors, motor driver, linear way, ball screw, and ball spline. The second working axis utilizes a ball screw groove and a ball spline groove, servo motors and servo motor driver. Concerning the cost, the cost of the first is two or more times of that of the second. Nowadays, the SCARA robot is to increasingly important on an automated factory, so that a high cost and complicated SCARA robot but with low stability is no longer meeting demands of the industry. Therefore, a new SCARA robot structure and driving method thereof is required in the industry.

SUMMARY

According to one aspect of the present disclosure, an apparatus for driving a SCARA robot is provided; the apparatus for driving a SCARA robot includes a base, an articulated rotating arm, a horizontal rotating arm, a linear motor coil, and a vertical magnetic axis. The articulated rotating arm is pivotally disposed on the base. The horizontal rotating arm is pivotally disposed on the articulated rotating arm. The linear motor coil is disposed on the horizontal rotating arm. The vertical magnetic axis is passed through the linear motor coil and producing a non-contact magnetic force, and the vertical magnetic axis is reciprocally moved on the horizontal rotating arm by the linear motor coil.

According to another aspect of the present disclosure, an apparatus for driving a SCARA robot is provided; the apparatus for driving a SCARA robot includes a base, an articulated rotating arm, a horizontal rotating arm, a linear motor coil, an anti-falling device and a vertical magnetic axis. The articulated rotating arm is pivotally disposed on the base. The horizontal rotating arm is pivotally disposed on the articulated rotating arm. The linear motor coil is disposed on the horizontal rotating arm. The anti-falling device is disposed on the horizontal rotating arm, wherein the anti-falling device includes an elastic space. The vertical magnetic axis is passed through the linear motor coil for producing a non-contact magnetic force, and the vertical magnetic axis is reciprocally moved on the horizontal rotating arm by the linear motor coil.

According to still another aspect of the present disclosure, a method for driving a SCARA robot is provided; a method for driving a SCARA robot includes: a linear motor coil is disposed on the SCARA robot; a vertical magnetic axis is passed through the linear motor coil; an electric power is applied to the linear motor coil so as to make the vertical magnetic axis produce a non-contact magnetic force; and a vertical displacement of the vertical magnetic axis is driven by the linear motor coil.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
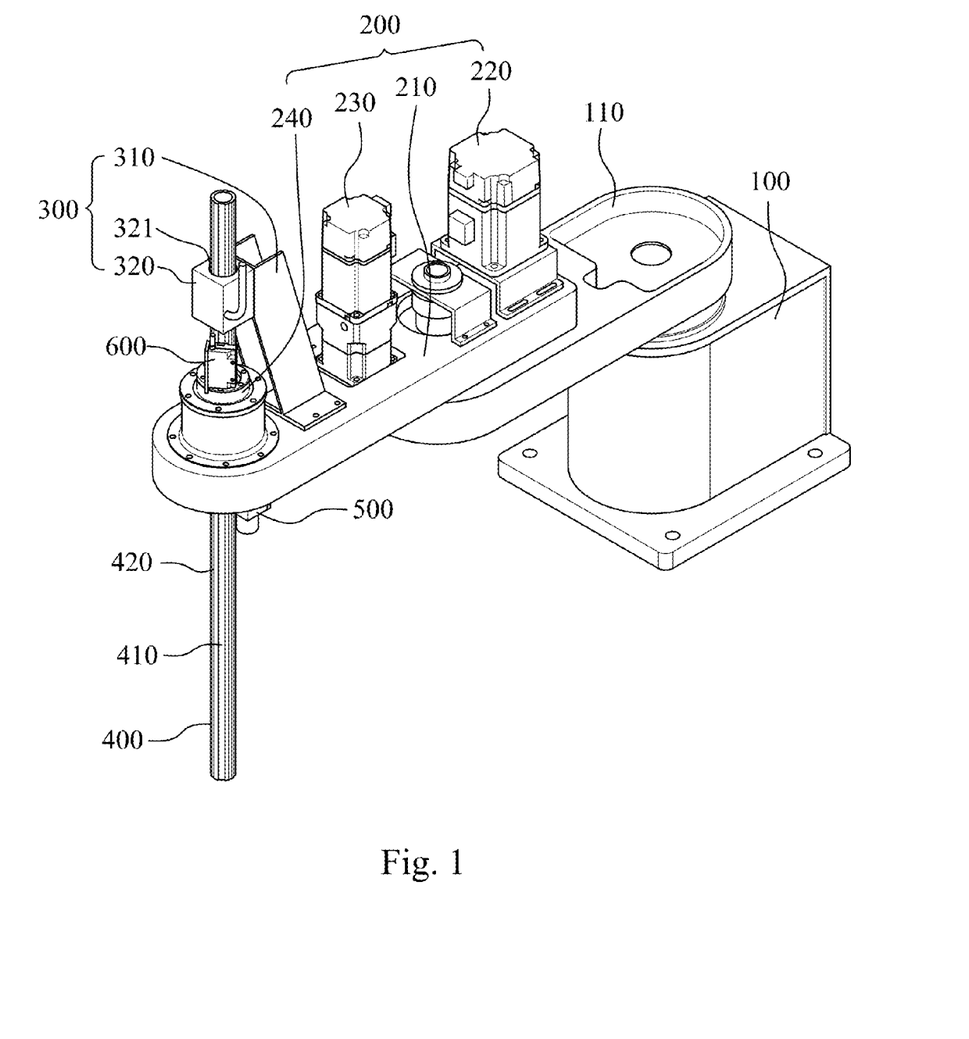
FIG. 1 is a three-dimensional view of a SCARA robot according to an embodiment of the present disclosure.
Figure 2:
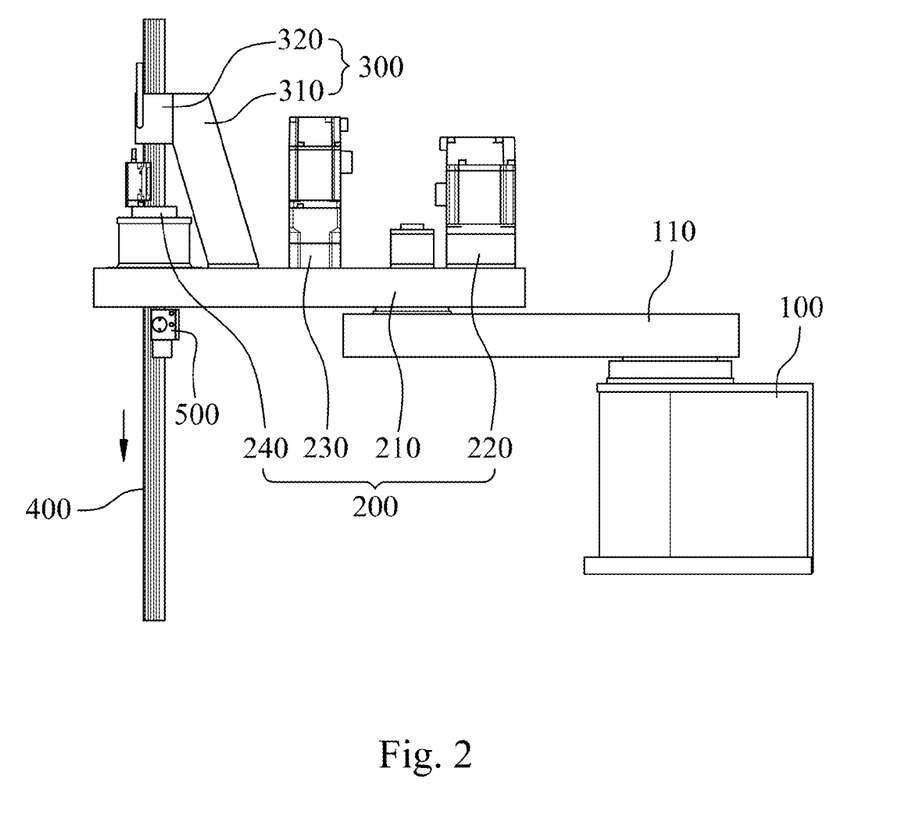
FIG. 2 is a side view showing a lowering state of a vertical magnetic axis of the SCARA robot of FIG. 1.
Figure 3:
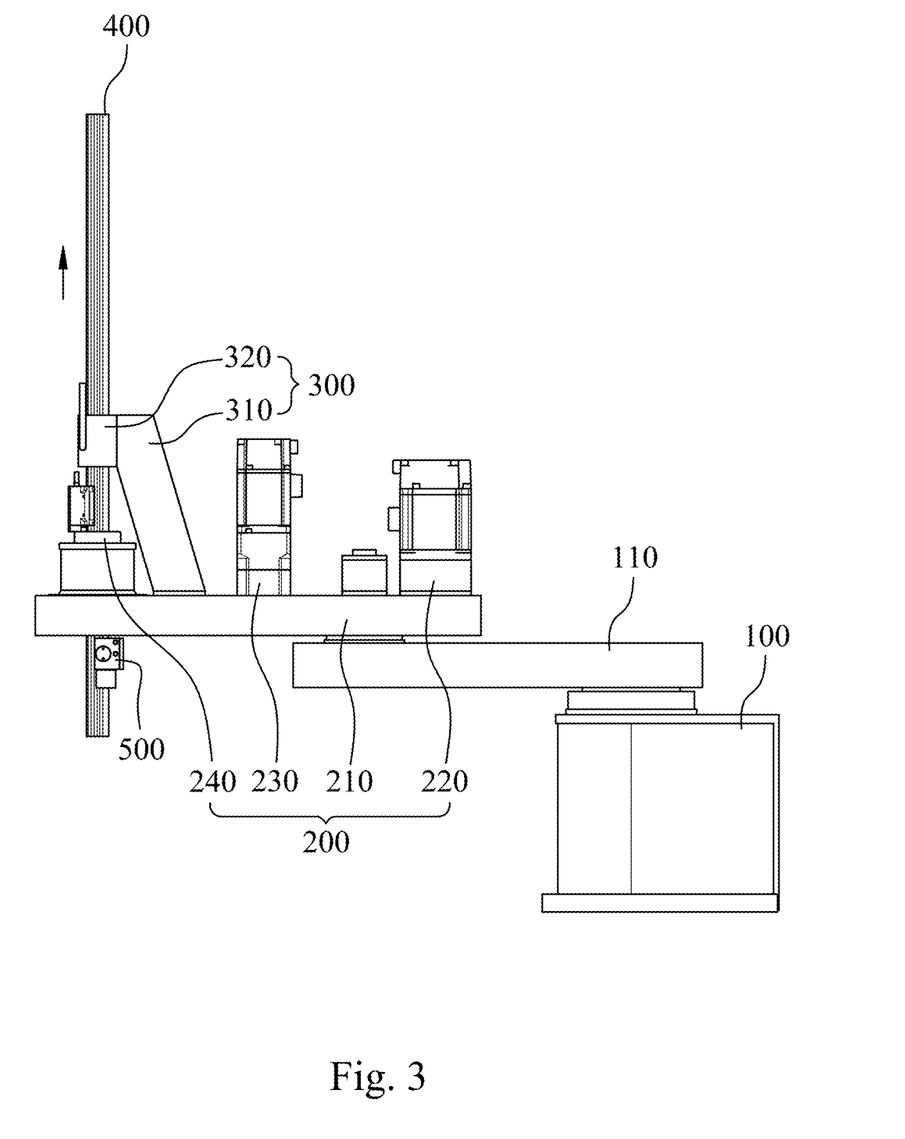
FIG. 3 is a side view showing a raising state of the vertical magnetic axis of the SCARA robot of FIG. 1.
Figure 4:
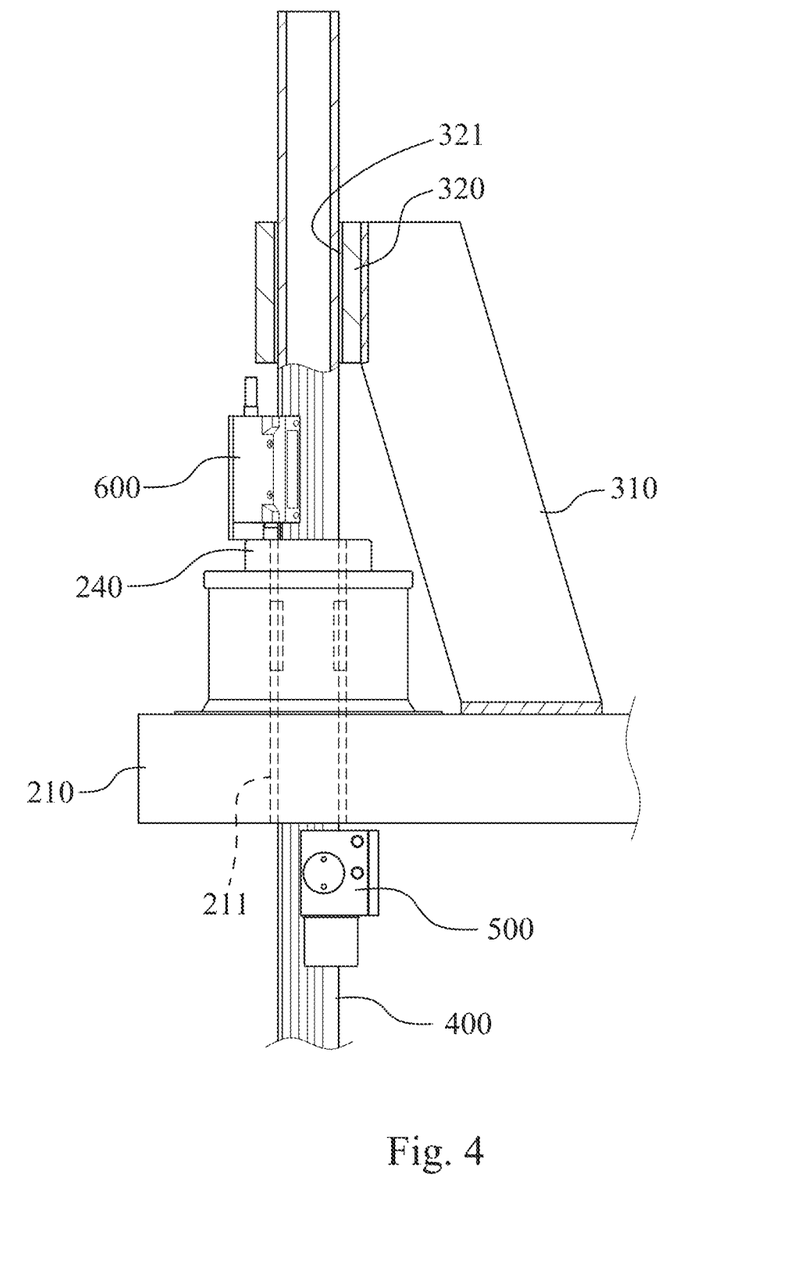
FIG. 4 is a partial sectional view of a driving apparatus of the SCARA robot of FIG. 1.
Figure 5:
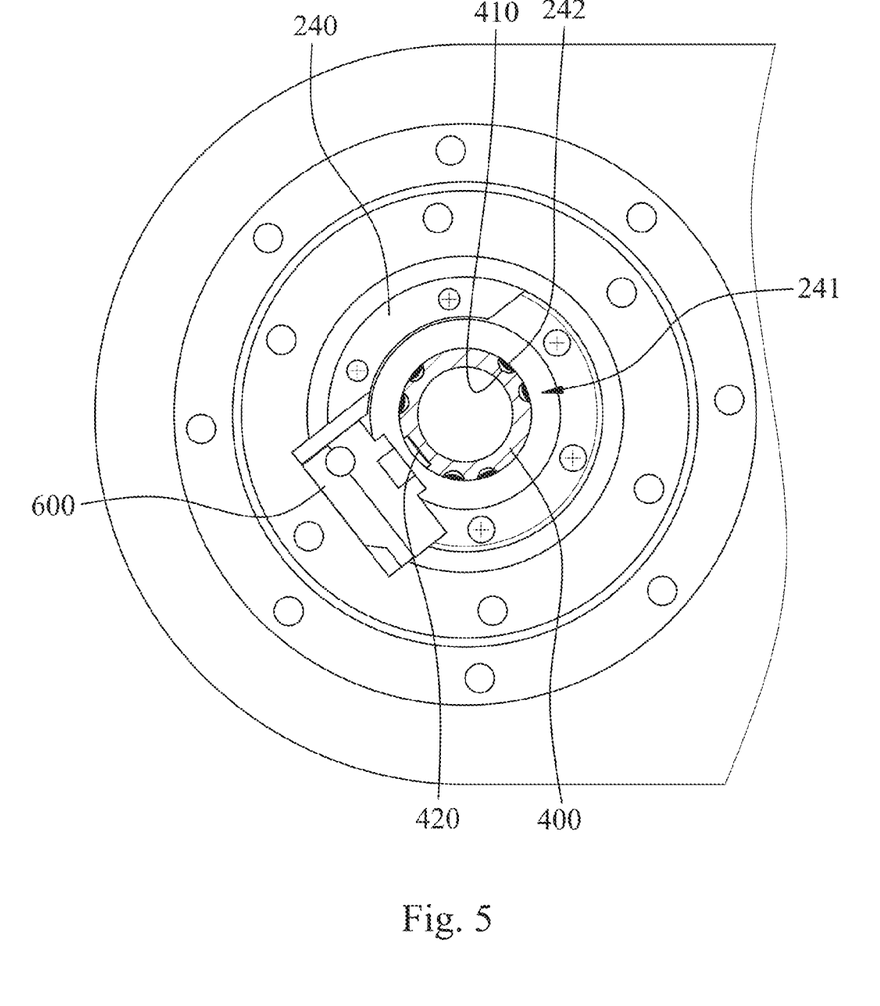
FIG. 5 is a plan schematic view showing the vertical magnetic axis driven by a rotating shaft of the driving apparatus of the SCARA robot of FIG. 1.

Referring to FIG. 1 to FIG. 5, FIG. 1 is a three-dimensional view of a SCARA robot according to an embodiment of the present disclosure; FIG. 2 is a side view showing a lowering state of a vertical magnetic axis 400 of the SCARA robot of FIG. 1; FIG. 3 is a side view showing a raising state of the vertical magnetic axis 400 of the SCARA robot of FIG. 1; FIG. 4 is a partial sectional view of a driving apparatus of the SCARA robot of FIG. 1; and FIG. 5 is a plan schematic view showing the vertical magnetic axis 400 driven by a rotating shaft 240 of the driving apparatus of the SCARA robot of FIG. 1.

The driving apparatus of the SCARA robot according to an embodiment of the present disclosure includes a base 100, an articulated rotating arm 110, a horizontal rotating arm 200, a linear motor coil 300, a vertical magnetic axis 400, an anti-falling device 500 and an optical counter 600. The articulated rotating arm 110 and the horizontal rotating arm 200 are connected horizontally and are rotated horizontally. A detailed assembly of the aforementioned components is described as follows:

The base 100 is positioned in a pre-determined position, and a first axial motor (not shown) is disposed in the base 100.

An end of the articulated rotating arm 110 is pivotally disposed on the base 100, and the articulated rotating arm 110 is driven by the first axial motor for rotating horizontally or non-horizontally.

The horizontal rotating arm 200 includes an arm body 210, a second axial motor 220, a rotating motor 230 and a rotating shaft 240. An end of the arm body 210 is pivotally disposed to the other end of the articulated rotating arm 110. The horizontal arm 200 is driven rotationally relative to the articulated rotating arm 110 by the second axial motor 220. A hole 211 is formed on the other end of the arm body 210. The rotating motor 230 is disposed on the arm body 210, and the rotating shaft 240 is disposed on the hole 211 of the arm body 210. An opening 241 is formed on the rotating shaft 240, and the opening 241 is disposed relative to the hole 211. A plurality of driving part 242 is disposed in the opening 241 (referring to FIG. 5), and the driving part 242 is rotated by the rotating motor 230 by the rotating shaft 240. The rotating motor 230 and the second axial motor 220 utilize a belt cooperated with a pulley for a driving action. A ball spline nut disposed in the rotating shaft 240 is driven by the belt, and the driving part 242 is driven rotationally along an axial direction in the opening 241 by the ball spline nut. In the embodiment, the driving part 242 is rotationally driven by the conventional ball spline nut cooperated with a ball, there is no more repeat.

The linear motor coil assembly 300 includes standoffs 310 and a linear motor coil 320. The linear motor coil 320 is stably disposed on the arm body 210. A displacement space 321 is formed on the center of the linear motor coil 320, and the displacement space 321 is formed relative to the opening 241 and the hole 211.

The vertical magnetic axis 400 is passed through the opening 241, the hole 211 and the displacement space 321. A plurality of ball spline groove 410 is formed along the axial direction of the vertical magnetic axis 400. A plurality of linear scale 420 is disposed along the axial direction of the vertical magnetic axis 400. The ball spline groove 410 (as a driven part) is rotationally driven by the driving part 242, and the vertical magnetic axis 400 is rotated in the radial direction but not moved axially by the ball spline groove 410 (driven part).

Figure 7A:
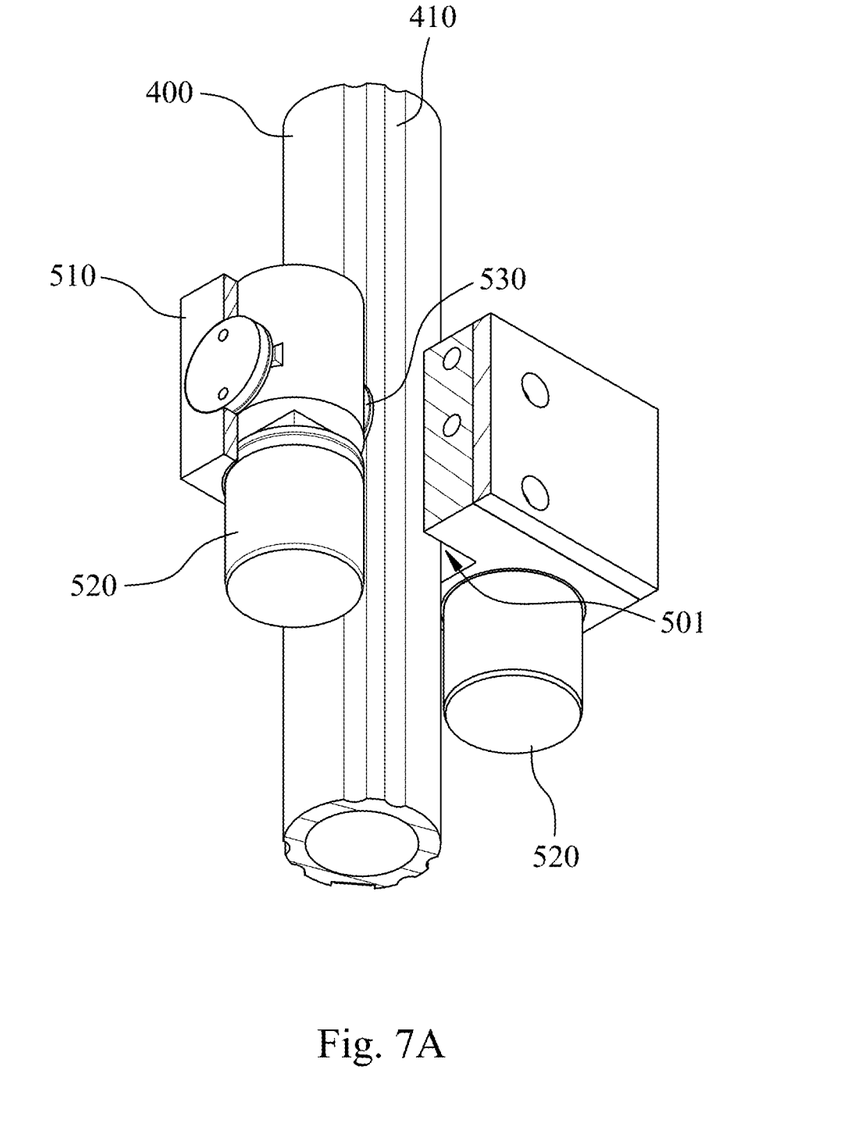
FIG. 7A is a partial sectional view of an anti-falling device and the vertical magnetic axis of the driving apparatus of the SCARA robot of FIG. 1.
Figure 7B:
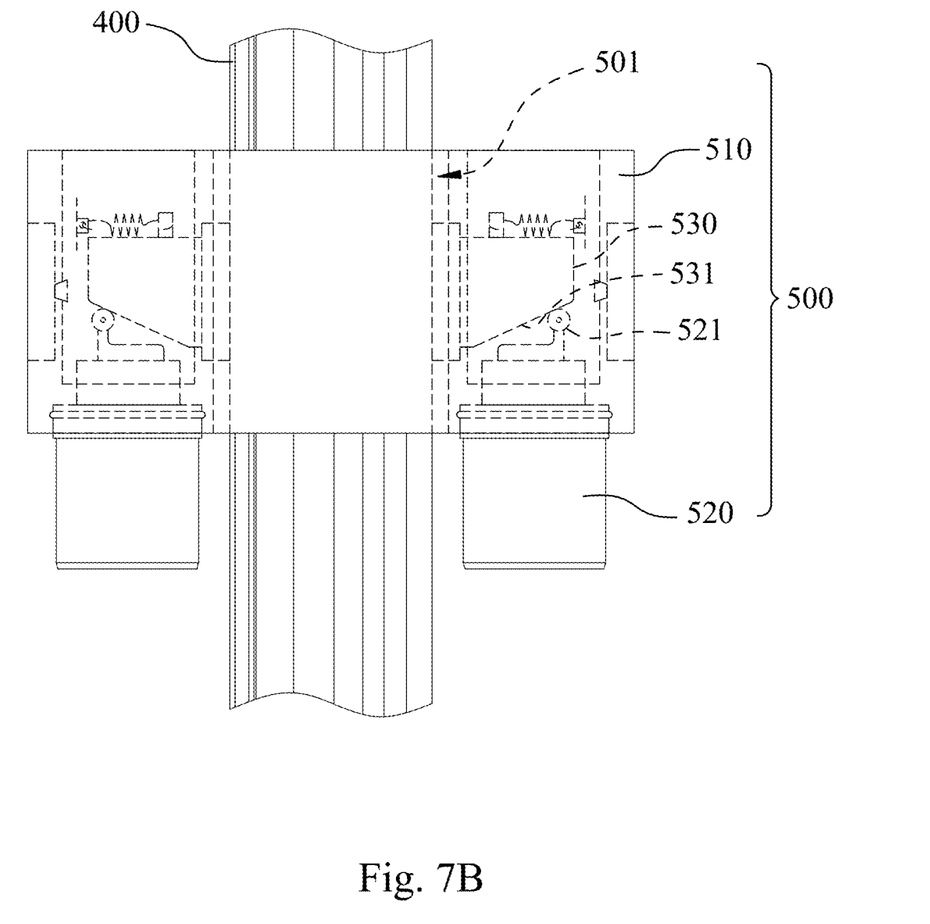
FIG. 7B is a sectional view of the anti-falling device and the vertical magnetic axis of the driving apparatus of the SCARA robot.

The anti-falling device 500 includes two bases 510, two electrical-magnetic valves 520 and two elastic components 530. The two bases 510 are relatively disposed on the arm body 210 of the horizontal rotating arm 200, and an elastic space 501 is formed between the two bases 510, and the vertical magnetic axis 400 is passed through the elastic space 501. The electrical-magnetic valve 520 is disposed on the base 510. The elastic component 530 is moveably disposed in the base 510 and having an inclined plane 531. The electrical-magnetic valve 520 is withstanded to the inclined plane 531 by a rod 521. When the electric power of the driving apparatus of the SCARA robot is cut off owing to an accident, the electrical-magnetic valve 520 is set to drive the elastic component 530 into the elastic space 501, and the two elastic components 530 are entered to the elastic space 501 for withstanding the vertical magnetic axis 400. Therefore, an unexpected drop of the vertical magnetic axis 400 can be prevented.

An optical counter 600 is disposed on the rotating shaft 240 and the optical counter 600 is rotated with the rotating shaft 240. The optical counter 600 is disposed relative to the linear scale 420. The optical counter 600 can be used for reading data on the linear scale 420 in order to determine the position of the vertical magnetic axis 400.

Figure 6:
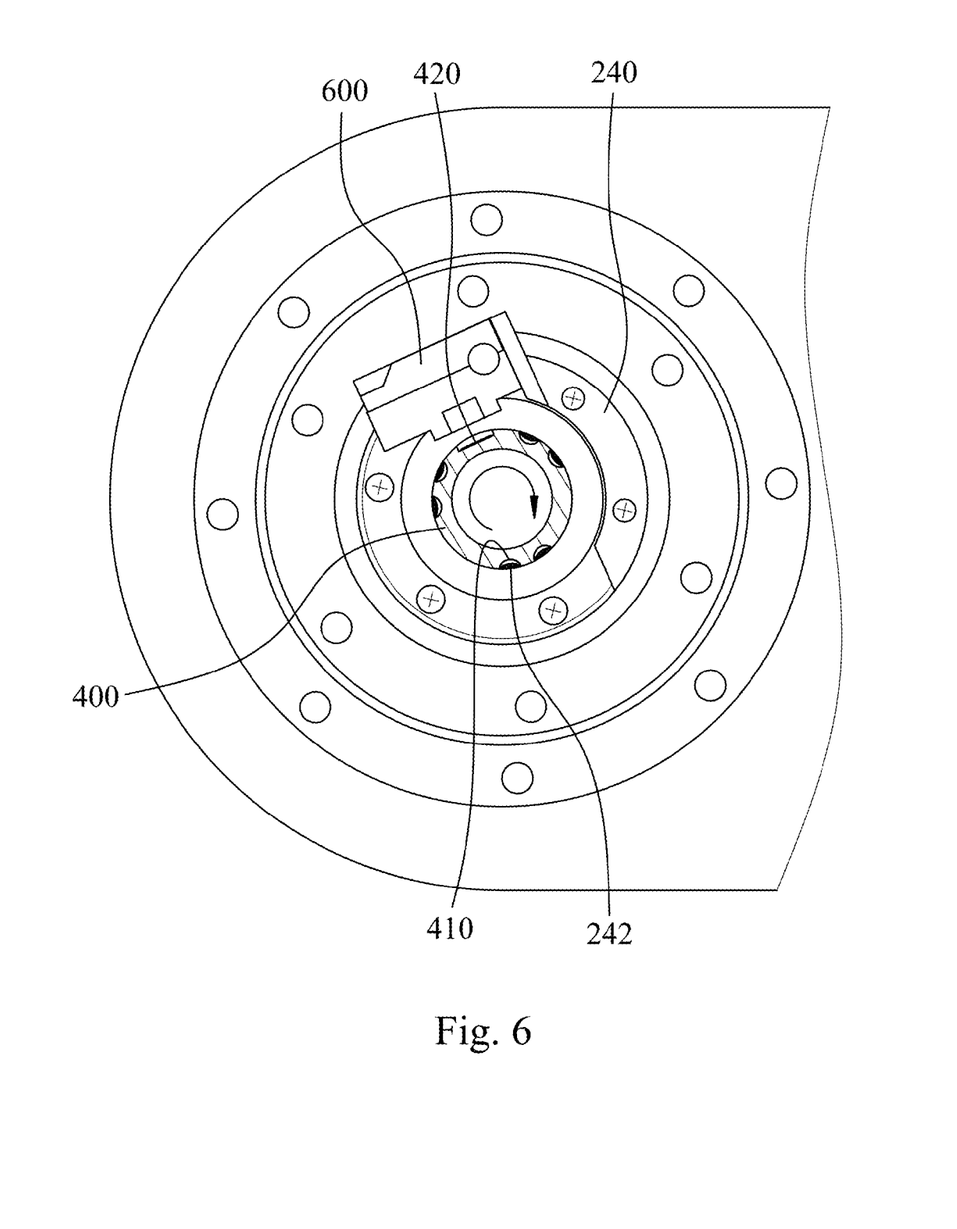
FIG. 6 is a plan schematic view showing the vertical magnetic axis rotationally driven by the rotating shaft of the driving apparatus of the SCARA robot of FIG. 5.

Referring to FIG. 6, FIG. 7A and FIG. 7B, FIG. 6 is a plan schematic view showing the vertical magnetic axis 400 rotationally driven by the rotating shaft of the driving apparatus of the SCARA robot of FIG. 5; FIG. 7A is a partial sectional view of an anti-falling device 500 and the vertical magnetic axis 400 of the driving apparatus of the SCARA robot of FIG. 1; and FIG. 7B is a sectional view of the anti-falling device 500 and the vertical magnetic axis 400 of the driving apparatus of the SCARA robot.

The horizontal rotating arm 200 is pivotally disposed on the base 100 by the articulated rotating arm 110. The linear motor coil 320 is disposed on the horizontal rotating arm 200, and the vertical magnetic axis 400 is magnetized thus having magnetism. Therefore, the vertical magnetic axis 400 is passed through the displacement space 321 of the linear motor coil 320 and producing a non-contact magnetic force, thereby driving the vertical magnetic axis 400 to raise and lower precisely. In this embodiment, the linear motor coil 320 and the vertical magnetic axis 400 are cooperated for preventing utilizing of heavy motors disposed on the arm body 210, and the non-contact magnetic force is utilized for replacing the convention mechanical driving apparatus being disposed on the arm body 210. Therefore, the embodiment of the present disclosure not only has a sensitive reaction, low weight, and low inertia, but has lower quantity of components and can reduce the manufacturing cost effectively.

The vertical magnetic axis 400 utilizes the linear motor coil 320 so that can raise and lower precisely, and the vertical magnetic axis 400 also utilizes the ball spline groove 410 for only rotating but not moving axially. Therefore, the vertical magnetic axis 400 can perform both rotate and raise and lower action in a vertical axis of the driving apparatus of the SCARA robot.

Moreover, for obtaining a better controllability of the raising and lowering action, the optical counter 600 is rotationally disposed on the rotating shaft 240, and the optical counter 600 is rotated synchronously with the vertical magnetic axis 400. Therefore, the optical counter 600 can read data on the linear scale 420 for identifying the raising and lowering position of the vertical magnetic axis 400. Furthermore, a complementary design is also performed for preventing an issue of unexpected drop of the non-contact magnetic force driving apparatus of the present disclosure.

When the electric power of the driving apparatus of the SCARA robot is cut off owing to an accident, the electrical-magnetic valve 520 is set to drive the elastic component 530 into the elastic space 501, and the two elastic components 530 are entered into the elastic space 501 for withstanding the vertical magnetic axis 400. Therefore, an unexpected drop of the vertical magnetic axis 400 can be prevented.

Figure 8:
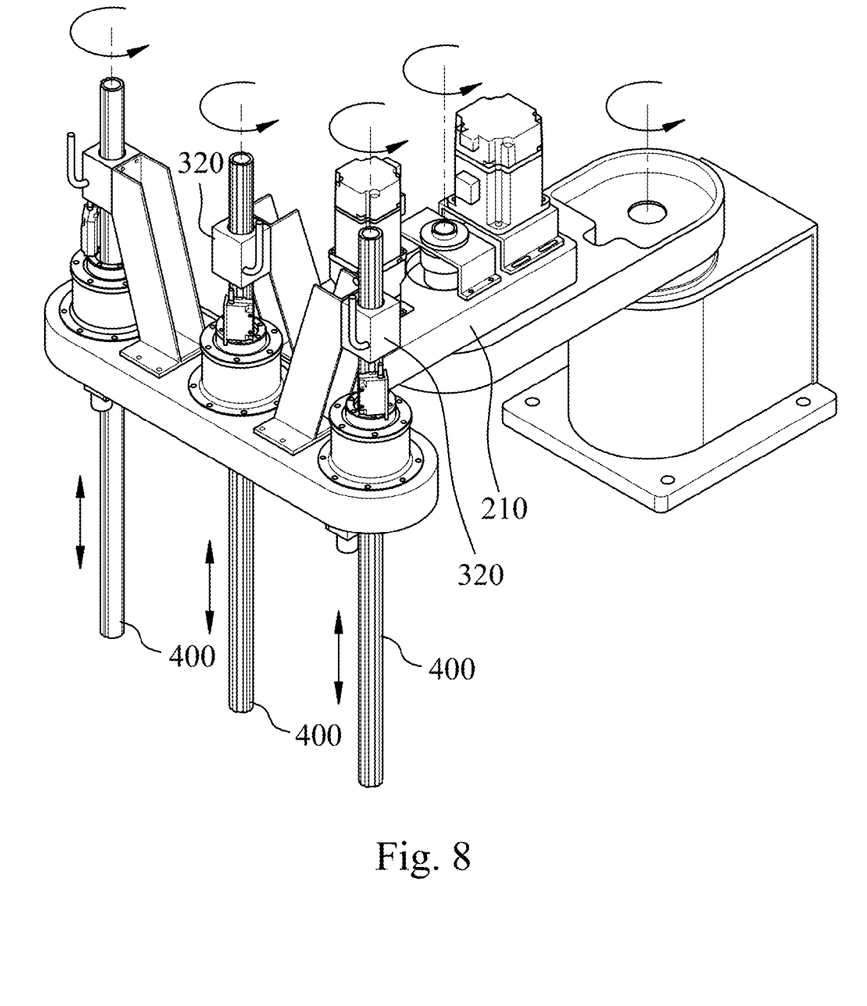
FIG. 8 is a three-dimensional view of a SCARA robot according to another embodiment of the present disclosure.

FIG. 8 is a three-dimensional view of a SCARA robot according to another embodiment of the present disclosure. In the embodiment of the present disclosure, the linear motor coil 320 and the vertical magnetic axis 400 are cooperated for preventing utilizing of heavy motors disposed on the arm body 210, and the non-contact magnetic force is utilized for replacing the conventional mechanical driving apparatus being disposed on the arm body 210. In one example, three linear motor coils 320 are disposed on the arm body 210. Therefore, three vertical magnetic axes 400 can be driven by a driving apparatus of the SCARA robot, thus the manufacturing cost can be reduced. Conventionally, the high manufacturing cost will occur due to applying extra equipment for the purpose of reducing inertia. In contrast, in the present disclosure, the simple assembly of the driving apparatus of the SCARA robot can reduce the manufacturing cost.

Figure 9:
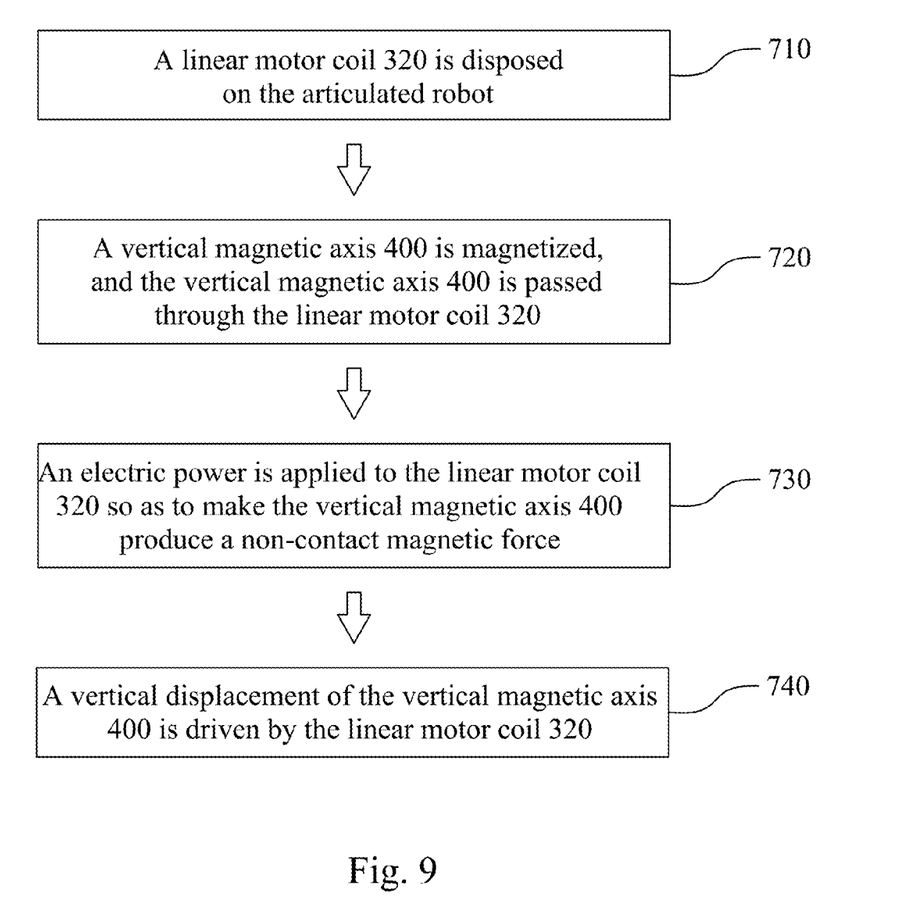
FIG. 9 is a flowchart showing a driving method according to an embodiment of the present disclosure.

FIG. 9 is a flowchart showing a driving method according to an embodiment of the present disclosure. The driving method includes at least the following steps:

In step 710, a linear motor coil 320 is disposed on the SCARA robot;

In step 720, a vertical magnetic axis 400 is magnetized, and the vertical magnetic axis 400 is passed through the linear motor coil 320;

In step 730, an electric power is applied to the linear motor coil 320 so as to make the vertical magnetic axis 400 produce a non-contact magnetic force; and In step 740, a vertical displacement of the vertical magnetic axis 400 is driven by the linear motor coil 320.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An apparatus for driving a SCARA (Selective Compliance Articulated Robot Arm) robot, comprising:
   a base;
   an articulated rotating arm pivotally disposed on the base;
   a horizontal rotating arm pivotally disposed on the articulated rotating arm;
   a linear motor coil disposed on the horizontal rotating arm;
   a vertical magnetic shaft passing through the linear motor coil for producing a non-contact magnetic force and being reciprocally moved on the horizontal rotating arm by the linear motor coil; and
   an anti-falling device disposed on the horizontal rotating arm, the anti-falling device comprising:
      at least two elastic components;
      at least two electrical-magnetic valves configured to respectively move the elastic components to push against the vertical magnetic shaft; and
      two anti-falling device bases disposed on the horizontal rotating arm,
      wherein an elastic space is present between the anti-falling device bases, the electrical-magnetic valves are respectively disposed on the anti-falling device bases, the elastic components are respectively disposed in the anti-falling device bases, the elastic components are respectively driven by the electrical-magnetic valves, and the vertical magnetic shaft is positioned by the elastic components when the elastic components enter the elastic space, at least one of the electrical-magnetic valves comprises a rod, at least one of the elastic components comprises an inclined surface, and the rod is driven by said at least one of the electrical-magnetic valves for withstanding the inclined surface.

2. The apparatus for driving a SCARA robot of claim 1, further comprising:
   a rotating shaft disposed on the horizontal rotating arm and having an opening, and a driving part rotationally disposed on the opening;
   a driven part disposed on the vertical magnetic shaft, wherein the vertical magnetic shaft passes through the opening, the driving and the driven parts are coupled along a radial direction, the driving part rotates the vertical magnetic shaft by the driven part, and the vertical magnetic shaft is configured to be rotated by the driving part in the radial direction but not moved axially;
   a linear scale disposed on the vertical magnetic shaft, wherein the linear scale is extended along an axial direction of the vertical magnetic shaft; and
   an optical counter rotationally disposed on the rotating shaft, wherein the optical counter is configured to be rotated by the rotating shaft.

3. The apparatus for driving a SCARA robot of claim 2, wherein the driven part is extended along the vertical magnetic shaft, and the driving and the driven parts are rotationally coupled along the radial direction.

4. The apparatus for driving a SCARA robot of claim 1, further comprising:
   a first axial motor disposed in the base, wherein one end of the articulated rotating arm is rotatable relative to the base by the first axial motor.

5. The apparatus for driving a SCARA robot of claim 1, wherein the horizontal rotating arm comprises:
   an arm body;
   a second axial motor for horizontally rotating the arm body;
   a rotating motor disposed on the arm body; and
   a rotating shaft disposed on the arm body and having an opening, a driving part disposed on the opening, and the driving part configured to be rotated at the opening by the rotating motor;
   the linear motor coil is disposed on the arm body; and the vertical magnetic shaft passes through the opening, and a driven part is disposed on the vertical magnetic shaft, wherein the driven part and the driving part are rotationally coupled along a radial direction, and the driving part rotates the vertical magnetic shaft by the driven part.

* * * * *